Dec. 28, 1965 H. BENMUSSA 3,226,487

TELEPHONE SYSTEMS

Filed Oct. 5, 1962 9 Sheets-Sheet 1

Inventor
H. BENMUSSA
By [signature]
Attorney

Inventor
H. BENMUSSA
By [signature]
Attorney

Dec. 28, 1965 H. BENMUSSA 3,226,487

TELEPHONE SYSTEMS

Filed Oct. 5, 1962 9 Sheets-Sheet 3

Inventor
H. BENMUSSA
By [signature]
Attorney

Inventor
H. BENMUSSA
By Paul W. Hemminger
Attorney

Dec. 28, 1965 H. BENMUSSA 3,226,487

TELEPHONE SYSTEMS

Filed Oct. 5, 1962 9 Sheets-Sheet 5

Inventor
H. BENMUSSA
By [signature]
Attorney

Dec. 28, 1965

H. BENMUSSA 3,226,487

TELEPHONE SYSTEMS

Filed Oct. 5, 1962

9 Sheets-Sheet 6

Inventor
H. BENMUSSA
By [signature]
Attorney

Inventor
H. BENMUSSA
By [signature]
Attorney

Dec. 28, 1965 H. BENMUSSA 3,226,487

TELEPHONE SYSTEMS

Filed Oct. 5, 1962 9 Sheets-Sheet 8

Inventor
H. BENMUSSA
By [signature]
Attorney

Dec. 28, 1965 H. BENMUSSA 3,226,487

TELEPHONE SYSTEMS

Filed Oct. 5, 1962 9 Sheets-Sheet 9

Inventor
H. BENMUSSA
By
Attorney 3,226,487
TELEPHONE SYSTEMS
Henri Benmussa, Meudon (Seine), France, assignor to International Standard Electric Corporation, New York, N.Y., a corporation of Delaware
Filed Oct. 5, 1962, Ser. No. 228,666
Claims priority, application France, Oct. 10, 1961, 875,500, Patent 1,313,802
5 Claims. (Cl. 179—18)

Figure 1:
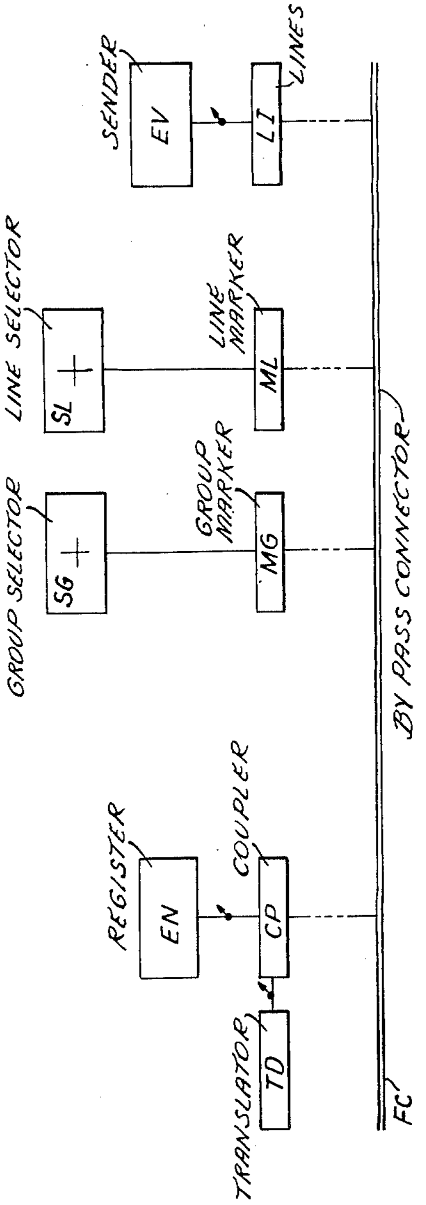

In most automatic telephone systems, two kinds of units are found. The ones called individual units remain seized during the whole length of the call; such is the case, for instance, of the call-finders, the selectors and the feed-junctors. The others, termed common control units are utilized only for establishing the call and are released as soon as the connection is made; among the latter can be mentioned, mainly, the register in charge of memorizing the called digits and retransmitting them according as the selection stages can receive them, and the markers which order the orientation of the selectors in relation to the digits received from the register. Between these different control units, there must be an exchange of technical information. To this end, the portion of selection chain already established can be made use of, but besides the two line wires, only two or three service wires are available, which limit possibilities. A connecting circuit, or bypath circuit can be provided, constituted by a certain number of groups of wires, hence enabling several bits of information to be transmitted practically instantaneously. Each bit of information is issued under coded form and a group of wires is allotted to it.

One of the essential qualities of an automatic telephone system is the flexibility with which it can adapted itself to different operational conditions. Centralized control systems, i.e.: those whose logic is concentrated in a small number of common units, offer better than any other such a quality, for the reason that adaptation to this or that installation is realized by the control unit. As a counterpart, the amount of information which must be processed by the control unit is very large and it is necessary for this information to be easily and rapidly exchanged between the different devices which constitute this unit. In the electromechanical systems, the connection of the common units with the bypath circuit takes a lapse of time which is not negligible and, even while occupying the bypath circuit only during the time strictly necessary to an exchange of information, one bypath circuit is generally not sufficient for handling the traffic; the quantity of these bypath circuits increases rapidly with the capacity of the exchange; in the case of a 20,000-line exchange, the connection equipment between the common units and the by path circuit gets to be considerable compared with the units themselves.

In order to solve this difficulty, an electronic solution is resorted to according to a well-known process, one bypath circuit only being utilized which applies the principle of multiplexing in time for transmitting service informaton. To each pair of units that will exchange information, a time-position is affected, determined within a cycle and gates associated with these units are rendered conducting during this time-position so as to give the units access to the common bypath circuit. The scanning of the units is performed by fast switches called "address scanners"; the time position allotted to each pair of units is very brief, so that only sampling of informations is transmitted as complete information requires several cycles. On the reception side, an appropriate integrator reconstitutes the bit of information from the samples. Therefore, only one bypath circuit is theoretically allotted to all pairs of units of the exchange; however, a second one is provided for reliability's sake.

The invention is concerned with a system of exchange of information of this type, offering different advantages of simplicity, economy and reliability.

One of the features of the invention lies in the fact of classifying the different units liable to exchange information as "active units" and "passive units" and of successively scanning the active units in order to check them and, in case a calling active unit is found, that is: wishing to proceed to an exchange of information, of rendering a gate associated with this unit conducting, so as to give access to the common information bypath circuit, a signal being then transmitted via the selection chain of the automatic switching equipment to the associated passive unit, so as to also render conducting the gate which gives access to the bypath circuit, these arrangements enabling an economy of positions of the address scanner during the scanning to be done.

Another feature of the invention concerns the fact that, when an active unit calls, an appropriate electric condition comes to the corresponding position of the address scanner in order to allow it to perform the test and that, when the passive unit is calling, this unit transmits, through the selection chain a signal to the active unit so as to render it calling, the operation being the same as in the case of a calling active unit.

Another feature of the invention concerns the fact of using two bundles of information wires in order to connect each unit to the bypath circuit, the first bundle of wires allowing information to be exchanged from the active to the passive unit and the second bundle permitting exchanges in the opposite direction.

Another feature of the invention concerns the fact of associating with the address scanner a logical circuit for emitting the current provided for the checking towards the active unit, and of receiving in the case of a calling unit, a "call information" and then of rendering conductive the gates which give access to the bypath circuit, the checking current being retransmited towards the passive unit in order to render conductive the gates associated with this unit.

Another feature of the invention concerns the fact of inserting, on the bypath circuit, a translator for converting information for immediate use by the receiving unit, said translator sending if necessary to the emitting unit, a request for complementary information, when it doesn't possess all the necessary elements for operating.

It is appropriate to allow, for the cycle of the address scanner, a constant duration as short as possible in order to simplify the construction of the integrating unit within the receiving unit and also to enable certain kinds of tests to be performed.

According to another feature of the invention, that fact of allotting a first lapse of time $t1$ to checking the active unit and, in the case case of a calling unit, a second lapse of time $t2$ to the transmission of information enables an appreciable economy of time to be contrived over the complete cycle of the address scanner, a certain number of units being idle, which is to say, not calling.

According to another feature of the invention, the length of a scanning cycle for a given number of devices $n1$ is determined and if the address scanner reaches the end of the cycle before having scanned these devices, it is locked and an artificial seizure of the devices is performed, i.e., without acting on either unit, the period of time $t2$ normally allotted to the transmission of information is measured, this operation being repeated until the sum of unit seizures, real and artificial, reaches $n1$, the address scanner being then unlocked, begins a new cycle as $n1$ is chosen in such a way that the probability of a number of simultaneous calls higher than $n1$ be small.

Another feature of the invention lies in the fact that, when the address scanner has found $n1$ calling units before arriving at the end of its cycle, it scans the remaining units, while the logical circuit does the check in the usual way except when this check is positive, which is to say, when it finds a calling unit, the duration of the cycle of the address scanner being the same even if there were only $n1$ calling units.

Another feature of the invention lies in the fact that in the limit case of a number of calling units equal to $n1$, the address scanner arrives at the end of its cycle immediately after having scanned the last of said units and begins a new cycle immediately.

According to another feature of the invention the active units are divided into groups, the information wires of one group are multipled on a common branch and all the branches of the exchange are in turn multipled on the information bypath the multiplings being arranged in a similar manner on the side of the passive units, with "$m$ out of $n$" code testing devices being inserted in the information bypath as well as in each branch, which arrangement, in case of fault, enables to limit the fault detection to a given group.

Another feature of the invention is the fact that, in case of fault, an active check unit connects itself via the information bypath to a passive check unit, the said active check unit transmitting successively all the code combinations until the fault has been found out, which enables to localize the defective wire or wires in the branch that corresponds to this check unit.

Another feature of the invention lies in the fact that two independent information bypaths, each possessing its address scanner and logical circuit are utilized for dependability and that these two bypaths operate normally in parallel, means being provided under the dependence of the "$m$ out of $n$" code checkers for a faulty bypath to be immediately eliminated, leaving only the other one in service.

Another feature of the invention lies in the fact that each unit consists of an electromechanical part and an electronic part, the second part only being doubled, the first having access to the two information bypaths, and furthermore that, for economical purposes only, one wire serves as wire C for the exchange of signals via the selection chain, a current of determined direction being used when the unit is scanned by the first information bypath and a current of reverse direction when the unit is scanned by the second information bypath.

Another feature of the invention lies in the fact that, for exchanging signals via the selection chain, a more intense current is used for one of the information bypaths, in such a way that, when the address scanners are in phase, this current is predominating, the exchange of information being then effected via the first bypath, the second one remaining un-used.

Another feature of the invention lies in the fact that when the two address scanners are in phase, some of the bits of information contained in both logical circuits as well as information coming from the two translators, are compared, means being provided in case of discordance to operate any appropriate signalling, this arrangement enabling to test the translators without it being necessary to convey to them, by means of the test units, all the possible combinations of information.

Another feature of the invention lies in the fact of associating with each of the two address scanners, a device for controlling the duration of a cycle, which gives all useful signals in case this duration is inaccurate and especially, when the address scanner goes out of order.

Another feature of the invention lies in the fact that for each of the $m$ elements of an information code a curruent of determined intensity $i$ is sent into a resistor, in such a way that if the code is accurate, the total intensity in the said resistor be close to $mi$, comparators being provided for detecting any difference resulting from a spurious code; i.e.: comprising a number of elements different from $m$.

Figure 2:
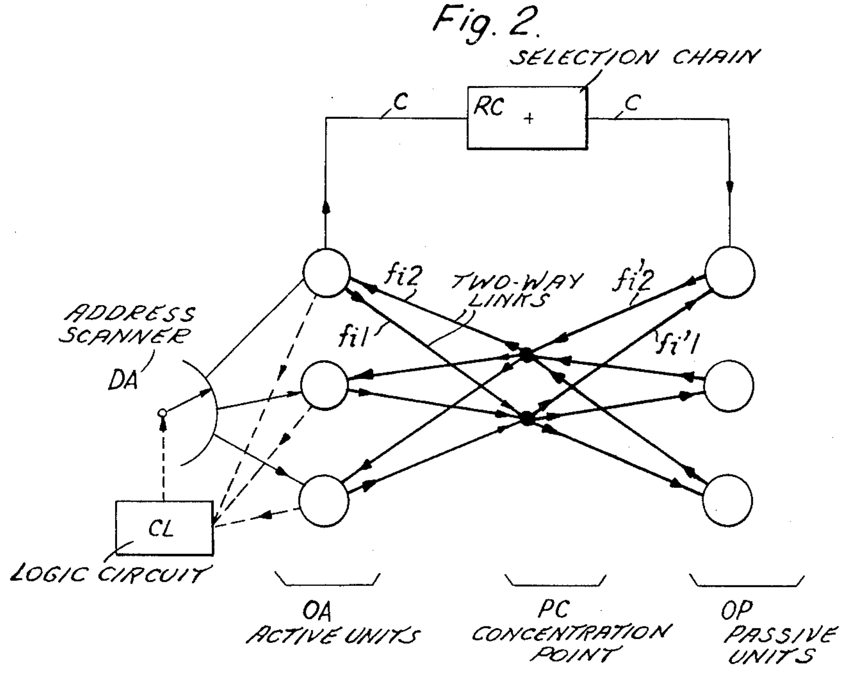
Figure 3:
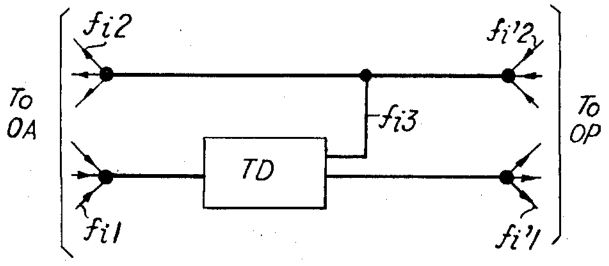
Figure 4:
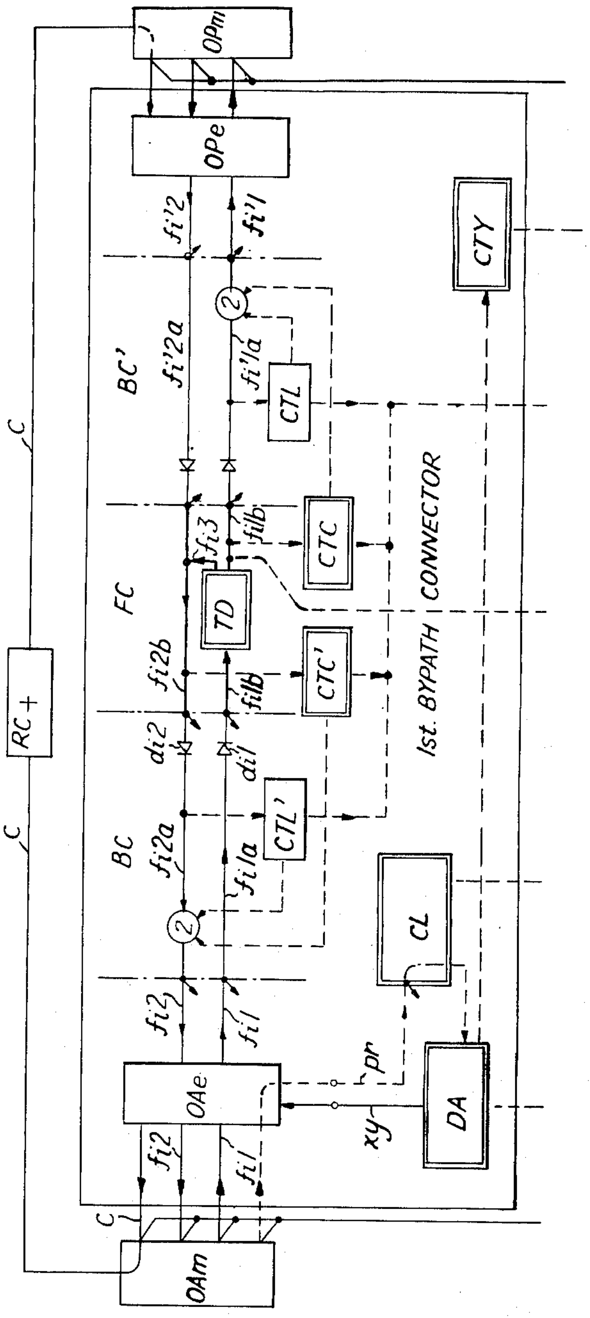
Figure 5:
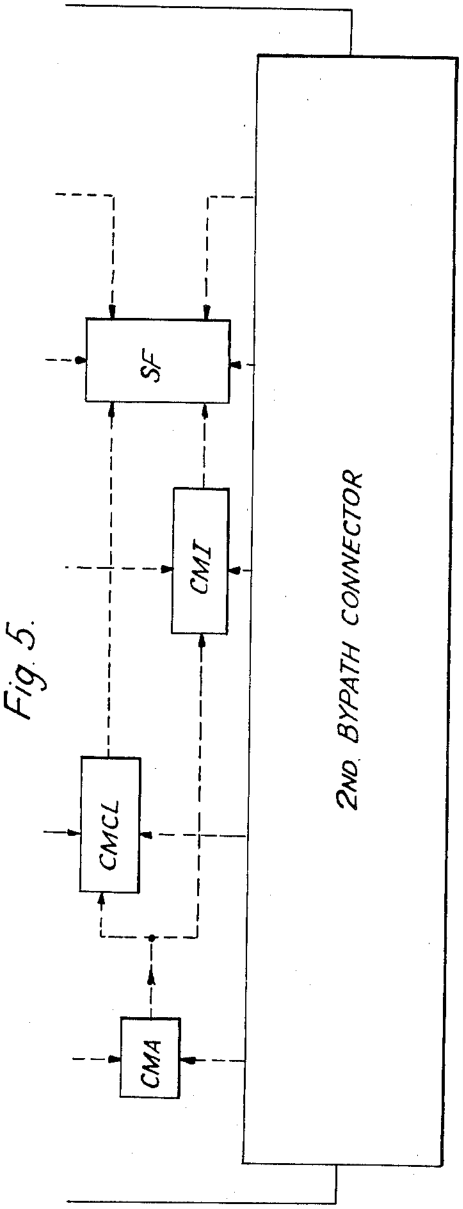
Figure 6:
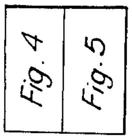
Figure 7:
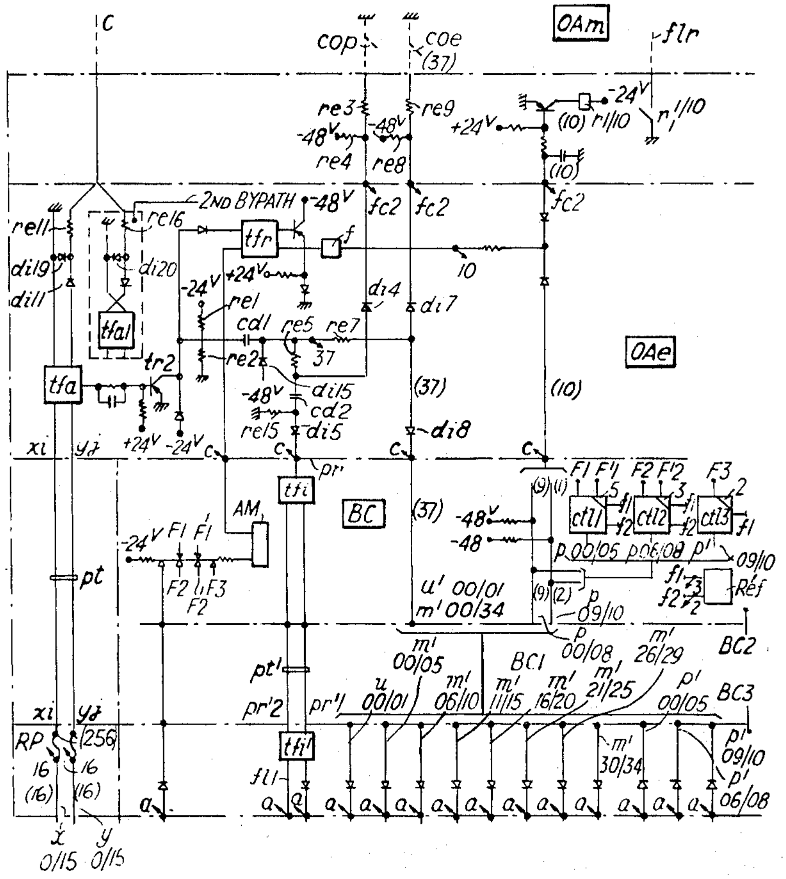
Figure 8:
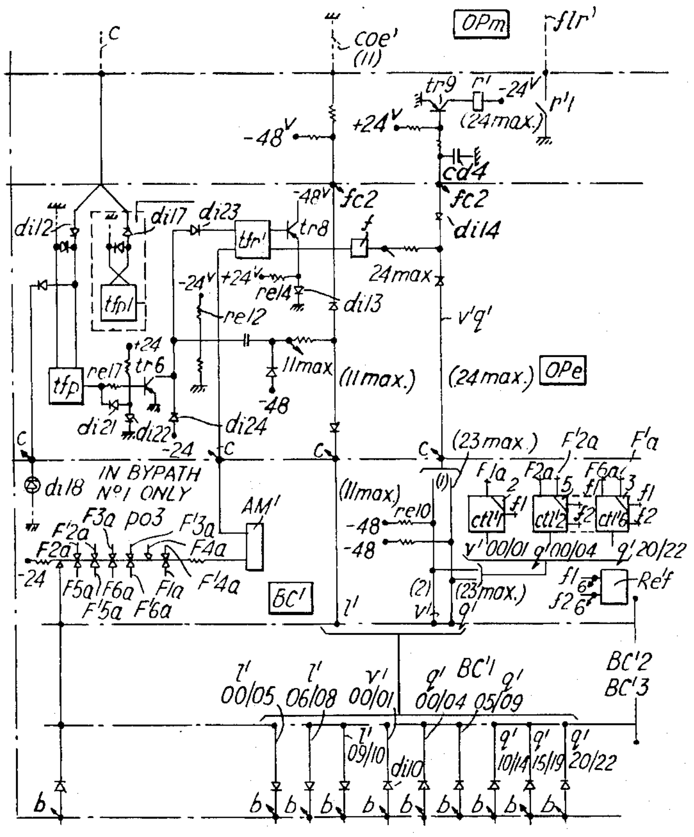

Various other features will be disclosd by the following description which is given by way of non-limited example and with reference to the accompanying figures which represent:

FIGURE 1, a diagram illustrating the main common control units utilized in a telephone exchange of well-known type, as well as the information bypath which allows the exchange of information between said units;

FIGURE 2, a theoretical diagram of the information bypath embodied according to the invention;

FIGURE 3, a detailed fraction of the information bypath concerned with the translation of the information;

FIGURES 4 and 5, a general operation block diagram enabling to explain the process of exchange of information via the information bypath;

FIGURE 6, a plan showing how to unite FIGURES 4 and 5;

FIGURE 7, the detailed diagram of an active unit and of the common branch which connects a group of active units to the information bypath;

FIGURE 8, the detailed diagram of a passive unit and of the common branch connecting a group of passive units to the information bypath.

Figure 9:
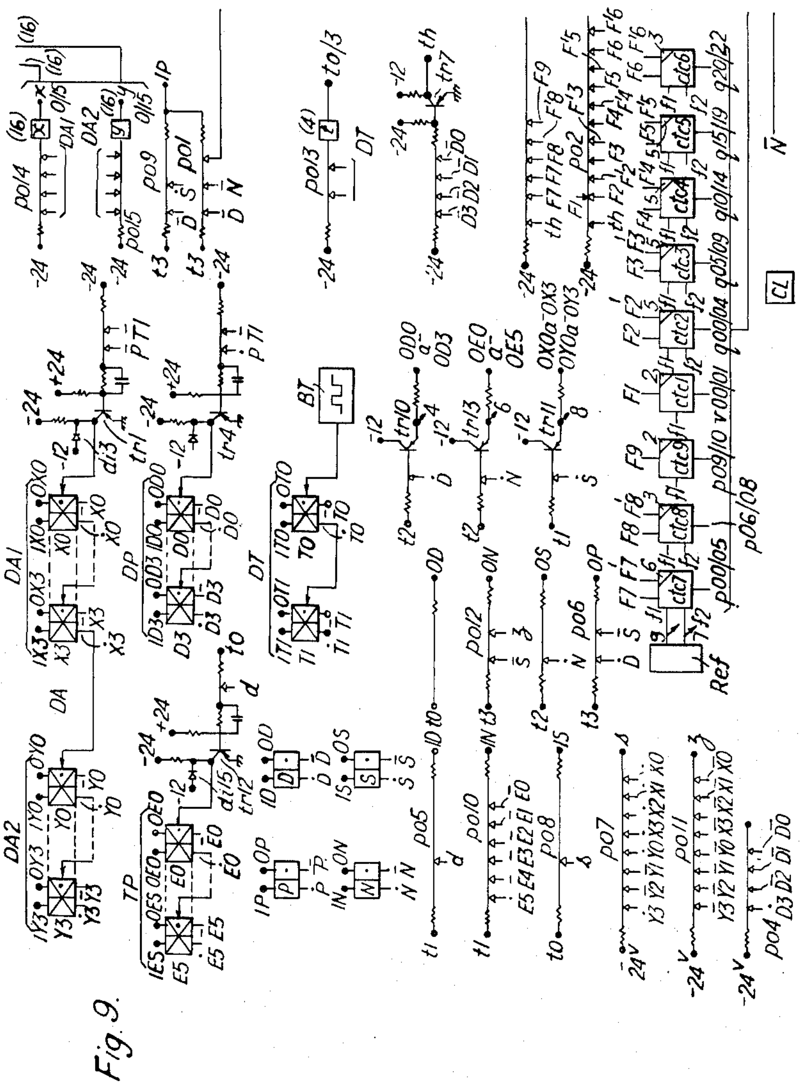
Figure 10:
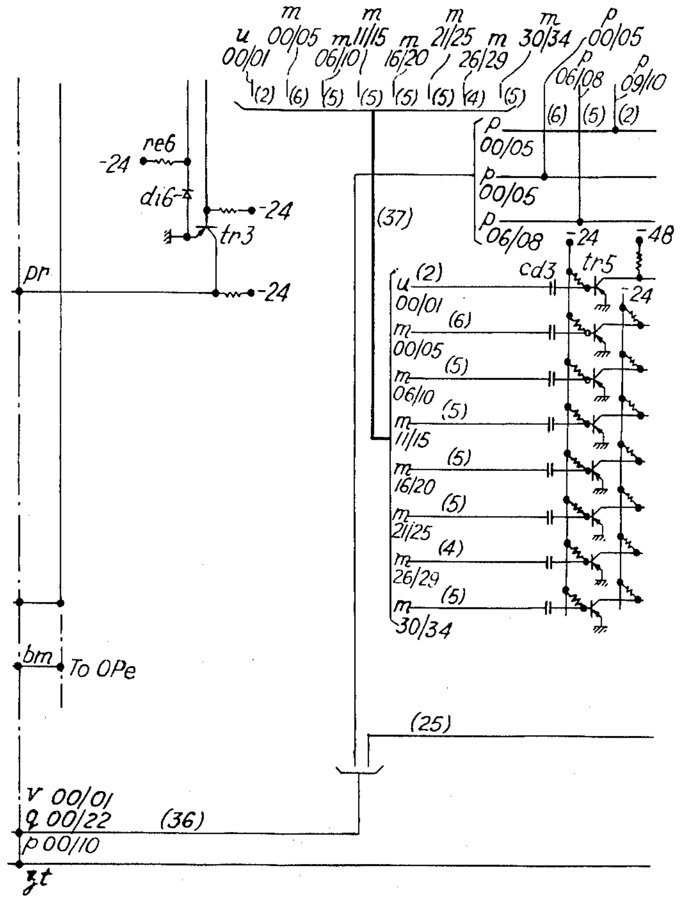
Figure 11:
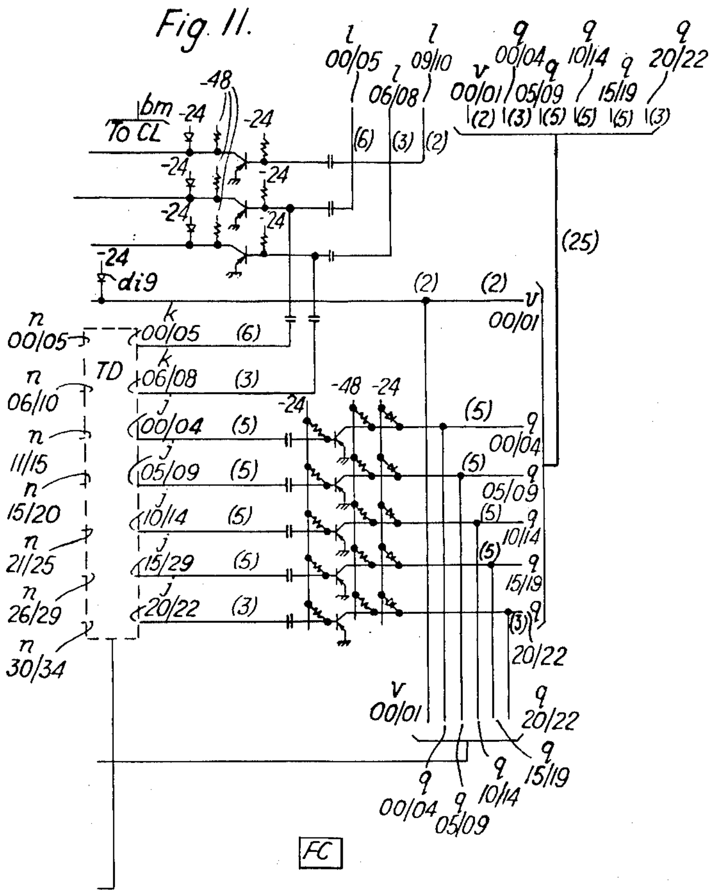
Figure 12:
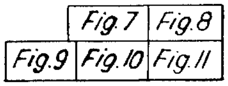
Figure 13:
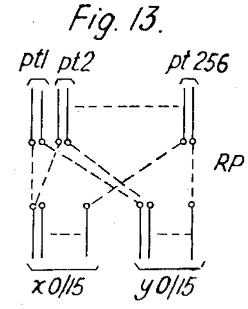

FIGURE 9, the detailed diagram of logical circuit;

FIGURES 10 and 11, the detailed diagram of the information bypath;

FIGURE 12, plan showing how to unite FIGURES 7 to 11;

FIGURE 13, the diagram of the address scanner.

Referring to FIGURES 1 to 6, the general operation of the system will now be outlined. The invention has been studied for a telephone system utilizing multiselectors with crossed bars of average capacity, and equipped with a marker per stage. However, the solution given by the invention is very general and applies to telephone systems of the most varied types.

*Exchange of information between the main units of a telephone exchange of well-known and currently used type*

The main control units utilized in the previously mentioned telephone system are the register EN (FIGURE 1), the group marker MG, the line marker ML and the sender EV. The register EN receives the different digits dialed by the calling subscriber and stores them so as to transmit them to the different selection stages according to the receiving possibilities of the latter. The group marker MG receives from the register the samples of subscriber's code which enables it to orientate the associated selection stage S.G. either onto a group of local subscribers, or onto a group of outgoing circuits; the line marker ML receives from the register the sample of subscriber's code which enables it to perform the selection of the called subscriber within its group; and finally, the sender EV receives the different digits that will be transmitted over an outgoing circuit so as to adapt them to the conditions of transmission of this circuit. Thus, for example, the digits are transmitted over particular circuits as numerical impulses; on others, as polarity combinations of D.C. current or different frequency currents.

Some information can be exchanged, on the one hand, between the register and, on the other hand, between the group marker, the line marker and the sender. The register transmits to the markers the digits necessary to selection as well as other complementary indications such as the class of the calling line. The markers send the register an acknowledgement of receipt and after each selection an indication of the class of the called line. These different bits of information could obviously pass via the selection chain; but outside of these two line wires, only two or three service wires would be available. In order to economize time and transmit several bits of information almost instantaneously, it is preferable to use the F.C. (information bypath); by using the code well-known and currently used under the name of "two-out-of-five," a bundle of 5 wires is provided per bit of information, a 20-wire group enabling 4 bits of information to be transmitted at once. Naturally, this information bypath remains seized, during the shortest possible time, so as to limit the total number of bypaths to be provided in the exchange. Markers MG and ML, of which there are few, are directly connected to bypath F.C.; on the other hand, registers EN are connected by means of the common units CP called couplers. Besides the function of intermediates between the register and the information bypath, the couplers play a part in switching; they receive from a marker via the selection chain, the code number of the chosen bypath so as to connect themselves to it in turn. Also, senders EV have access to the information bypath FC through common units LI or links. And lastly, some bits of information coming from the register EN are converted by a translator TD before being sent to the information bypath.

*General layout of equipment*

According to the invention, the different common control units are divided into "active units" OA (FIGURE 2) and "passive" OP. The former comprise essentially the couplers; the latter, the markers, the senders and various other units not specifically mentioned. Each active unit OA is connected to the concentration point PC via two groups of wires. The first group of wires *fi*1 is utilized to transmit information from the active unit OA to the concentration point PC; the second group of wires *fi*2 is used to transmit information from the concentration point PC to the active unit OA. When using the "two-out-of-five" code, five wires are provided for each group of wires *fi*1 and *fi*2, five wires per bit of information. The concentration point PC is therefore realized by means of a group of wires equal in number to the sum of the number of wires contained in groups *fi*1 and *fi*2; this connecting circuit is the information bypath. In the same way, each passive unit OP is connected to the concentration point PC by means of two groups of information wires *fi'*1 and *fi'*2, each group of wires being utilized for a determined transmission direction.

As theoretically, there is only one information bypath for the whole exchange, it is obvious that said information bypath can be used at a given instant only by a single pair of active-passive units. To this effect, the principle of multiplexing in time is utilized, a time position determined inside a cycle being alotted to each active unit. An address scanner DA, made up of a high speed electronic switch, scans continuously the different active units OA. When it arrives at a calling active unit, the logical circuit CL aassociated with the address scanner DA detects this calling condition, owing to this fact, an appropriate signal is sent to the considered active unit. A gate (not shown on the figure) is made conducting, thus enabling said unit to have access to the information bypath. The signal is then retransmitted over wire *c* and the selection chain RC, towards the passive unit OP which must be associated with the active unit considered; a second gate is also made conductive, thus enabling the passive unit to have access to the information bypath. The active unit and the passive unit remain connected via the information bypath during a certain length of time, the address scanner then stopping once to explore the following active unit. Naturally, the stopping period of the address scanner at an active unit is short and allows the transmission of a bit of information only. In order to send full information and ensure correct operation of the relays or of similar devices arranged within the passive unit, the same operation must be repeated during several successive cycles of the address scanner. Thus, the same information bypath is successively placed at the disposal of all the pairs of units.

Using the correspondence wire C enables an economy of positions to be made concerning the address scanner, as the active units only are scanned.

Some bits of information, transmitted by an active unit cannot be utilized such as they come in and must consequently be converted. Thus, for example, the couplers provide the group selection markers with selective indications concerning the routing of the call, i.e.: the office code of the called subscriber's number. These indications can be converted in order to cause in the marker the appearance of the identity of the private or of the outgoing group of junctions which correspond to the office code and can handle the call. The information transmitted by the active units towards the passive units pass accordingly via a translator TD placed at the concentration point (FIGURE 3). The information handled in the other direction, i.e.: passive units to active units are directly utilizable and do not need converting. When the translator has not the necessary elements to do its work with, it informs the active unit of this circumstance via wires *fi*3 and *fi*2; the latter unit then knows it must complete the information sent to the translator TD.

The general operation diagram is illustrated more clearly on FIGURES 4 and 5 juxtaposed as indicated in FIGURE 6. Each unit comprises two distinct parts, i.e.: an electromechanical part OA*m* essentially constituted by electromagnetic relays and an electronical part AO*e* constituted by diodes and transistors. In the same way, each passive unit includes an electromechanical part OP*m* and an electronical part OP*e*. The active units, like the passive units are divided into groups. Two wires start from the electromechanical part OA*m* of each active unit, the first, *fi*1, being utilized for transmitting information towards the common information bypath and the second wire *fi*2 for the transmission of information coming from this information bypath. These two wires *fi*1 and *fi*2 cross the electronical part OA*e*. Wires *fi*1 and *fi*2 of all the units of one group are respectively multipled on wires *fi*1*a* and *fi*2*a* of a branch BC special to said part. Wires *fi*1*a* and *fi*2*a* of all the groups are in turn multipled on wires *fi*1*b* and *fi*2*b* of the common information bypath FC. Diodes *di*1 and *di*2 are designed for allowing the information to pass only in one direction and thus prevent the untimely backward steps via common multipling points. The translator TD and the wire *fi*3 are arranged as indicated in FIGURE 3. On the side of the passive units, the information wires are multipled in similar fashion. Wires *fi'*1 and *fi'*2 of the units of a given section are multipled respectively on wires *fi'*1*a* and *fi'*2*a* of a branch BC'; wires *fi'*1*a* and *fi'*2*a* of all the branches BC' are multipled on the wires *fi*1*b* and *fi*2*b* of the information bypath FC. The address scanner DA, the logical circuit CL, the wire *c* and the selection chain RC, have the functions indicated in the description of FIGURE 2.

As previously indicated, the different bits of information as "two out of five" codes; in a more general way, "two out of *n*" codes can be utilized, n being a whole number depending on the quantity of desired combinations. Consequently, any code having less than two or more than two elements is faulty and must not be transmitted. Such faults originate either from severed wires or from untimely potentials on certain wires. In order to detect these incidents, central checking devices CTC, CTC' are placed in diversion on wires *fi*1*b* and *fi*2*b*, and local checking devices CTL, CTL' on wires *fi'*1*a* and *fi*2*a*, In the code transmitted from an active unit towards a corresponding passive unit is accurate, the central checking device CTC and the local checking device CTL render conducting a gate "AND" inserted on wire *fi'*1*a*, thus enabling the information to pass. In the contrary case, the case, the gate remains nonconducting. The test unit CTL enables the incident to be detected within a group and thus limit the searching. It would obviously be too expensive to provide a checking unit for each individual unit. The operation of the checking devices is the same for the other direction of information transmission.

It is worth noting that all the bits of information are not always present at the different phases of selection and that, conseqeuntly, a missing group of samples must be considered good. Checking the codes is consequently "a two out of $n$" or "zero out of $n$" check.

The transmission time of information is very short and practically, a single information bypath would suffice to handle all the traffic even in the case of a large exchange; however for reliability purposes, a second information bypath is provided. Actually, the information bypath associated with its translator constitutes a vital part of the telephone exchange, which cannot admit even the slightest interruption in the service. These two information bypaths normally operate in parallel. As nothing common has been retained between them, even for the time basis, each of the two information bypaths has its own time basis, hence their address scanners do not have synchronized movement movement. The electromechanical part OA*m* of each active unit has access to the two information bypaths. The same holds good for the electromechanical part OP*m* of each passive unit.

The equipment CMA, CMCL, CMI, SF does not belong to the information bypaths; it is utilized for checking the operation of the bypaths and for detecting possible faults.

*General operation*

Normally, the address scanner DA operates continuously. When it comes to the electronic part OA*e* of any active unit, a signal is sent over wire XY to check the condition of this unit. If this unit is not in calling position, the logical circuit CL receives no return information on wire *pr* and the address scanner DA steps immediately to the next unit. The stopping time of the address scanner is just sufficient to allow the check; practically, it ranges around 12 microseconds.

When the address scanner DA comes to an active unit in calling position, the said unit sends a bit of information termed "call" to the logical circuit CL via wire *pr*. Accordingly, the address scanner DA stops during sufficient time to enable information to be transmitted between the active and the passive units. These two units can be placed at a certain distance from one another and, owing to the characteristics of the circuits which connect them, transmission is not instantaneous. Making allowance for this transmission time on the one hand and the period during which the receiver is sensitized on the other hand, about 108 microseconds stopping time is allowed for the address scanner, in addition to the time necessary to checking the unit. Gates not indicated on the figures located in the electronic part OA*e* of the active unit become conducting thus enabling the said units to have access to the common information bypath FC. A signal is transmitted to the passive unit which must be associated with the active unit through wire *c* and the selection chain RC of the automatic switching equipment; gates placed in the electronic section OP*e* of the passive unit, become conducting, enabling said unit to have access to the information bypath FC. The active and passive units can therefore exchange information via the information bypath, this exchange being possible in one direction or the other.

In the electromechanical units, information on emission, is available as open or closed contacts; on reception, information is available as relays energized or not. On account of the slowness of operation of the relays, the exchange of information requires several operational cycles. It is therefore necessary to store the received information between two successive scannings of the address scanner. In the example described, this memory is made up of a condenser charged through weak impedance and slowly discharged between two scannings, the discharge impedance consisting of a resistor and a transistor which remains saturated as long as the discharge current retains a certain value. The cycle duration and the time constant of the condenser are determined in such a way that the transistor remains saturated during the length of time necessary to energize the receiving relay. This relay consists of a miniature relay which in turn controls a telephone type relay in the electromechanical unit. Such a receiver is sensitive only to the integral of current intensity by time; disturbances, even if intense but brief are without action on it. To eliminate the transmission parasital disturbances, the transmission contacts control the electronic gates whose impedance is very weak compared to that of the parasital disturbance sources encountered in a telephone exchange.

When the time allotted the transmission of information is elapsed, the address scanner DA resumes its course.

As has been indicated, the stopping time of the address scanner on a unit varies according as said unit must or not transmit information. It would therefore become necessary when special precautions are lacking to allow the address scanner a cycle duration depending essentially on the number of calling units. Actually, this duration should be constant in order to facilitate the construction of the receivers as well as permit particular checks. To this effect, the process is the following. Practically, the active units of the exchange are not all in calling position at the same time; the maximum number of units liable to call simultaneously will be designated as $n^1$. A counter termed "totalizer of seizure operations" located in the logical circuit CL, counts the number of units which have actually transmitted information during a cycle of the address scanner DA. At the end of the cycle, this number is compared with $n^1$. Generally, it is lower. In this case, the address scanner is locked and the logical circuit performs an artificial seizure; though it has no action over any unit, it measures a period of time equal to that normally allotted to the transmission of a bit of information, i.e.: in the present instance, 108 microseconds. The seizure operation totalizer then steps once as if a seizure operation and transmission of information had actually been achieved. The same process is repeated until the totalizer indicates $n^1$; the address scanner is unlocked and begins its cycle again. Under these conditions, things proceed in the same way, from the point of view of the duration of the address scanner cycle, as if $n^1$ units had been seized, the other units having simply been tested and found non calling.

In exceptional cases, the number of units that call simultaneously is higher than $n^1$; in which case the seizure operation totalizer indicates $n^1$ before the address scanner has scanned all the units. From this time on, no seizure can be performed; if a unit transmits a bit of calling information over wire *pr*, the logical circuit CL ignores it. No gate is conducting in the unit and the address scanner progresses onto the following unit after a pause at the considered unit, just the length of a check. The cycle duration is therefore the same as in the previous case.

Finally, if the number of units which call simultaneously is equal to $n^1$, the totalizer of seizure operations indicates $n^1$ after the last unit is scanned and the address scanner begins its new cycle immediately; the duration of the cycle obtained is always the same.

In case of transmission of inaccurate code one of the central checking devices CTC, CTC' or of local check CTL, CTL' prevents transmission by rendering a gate "AND" non conducting and acts on the fault signalling circuit SF which gives all appropriate supervision.

In order to detect a defective wire, in case of fault in a group of units, a special active test unit which uses the information bypath is utilized. This active unit is connected by a transmission wire *c* to a passive checking unit. The active unit or the passive unit, according to the transmission direction desired, transmits successively the different possible information combinations, until the fault is found. In the particular case where the fault is located among information coming from a translator, the number of combinations to be tried out would be too great; another method is resorted to which is developed hereunder.

If the duration of the cycle of the address scanner is not right and particularly if the latter stops, the defect is signalled by the cycle-checking device CTY.

Normally, the two information bypaths operate in parallel. When an active unit is in calling position, it transmits samples of information via the second. Nothing has changed in the operation of the information receiving relay. When one of the two information bypaths goes out of order the other bypath ensures the traffic alone.

The electromechanical part of the active and passive units is not doubled. This is without importance, because when one fails, the quality of service is not particularly altered. The transmission wires *c* are therefore not doubled and can be indifferently utilized by either bypath. In order to avoid any confusion, a current of determined direction is utilized for the signals transmitted over the wires *c* when the active unit is connected to the first information bypath and a current in reverse direction when this unit is connected to the second bypath. The passive unit therefore knows onto which bypath it must connect itself.

The two address scanners not being synchronized will periodically be found in phase. To prevent currents in reverse directions transmitted over the wire *c* from each other, a current of higher intensity is provided the first bypath. Under these conditions, there is nevertheless an exchange of information between the active unit and the passive unit, but on one of the bypaths only.

The periodical coincidence of the two address scanners over the same unit is utilized for performing a certain number of checks. On the moment of this coincidence, the address comparer CMA, connected to the two address scanners DA, acts on the logical circuit comparer CMCL; the latter compares some of the bits of information found in the two logical circuits and which should be identical. In the contrary case, the comparer CMCL acts on the fault signalling circuit S.E. In the same way, the comparer CM1 compares the information given by the two translators and acts on the circuit SF if the bits of information differ. Such an operation enables to locate the defective wires coming from the translator, which location had not been possible with the active and passive checking units. In the particular case where a bit of information is missing from the translator, the central checking device CTC cannot know whether the combination received by the translator is not convertible or if an incident occurs on one of the outgoing wires; the periodical comparison of the information coming from the translator enables to clear the doubt.

*Detailed operation*

Referring to FIGURES 7 to 11, juxtaposed as indicated on FIGURE 12, a detailed description of the main circuits will be made according to an embodiment of the invention.

The bistable circuits, such as D (FIGURE 9) have been represented by two rectangles side by side. The incoming wires 0D and 1D are located in the upper portion; the outgoing wires $\overline{D}$ and D are located in the lower portion. Normally this bistable is in 0 position, wire $\overline{D}$ being to potential −12 v. and the wire D earthed. In order to cause this bistable to shift to position 1, a negative potential is applied to the incoming wire 1D; wire D is then to the −12 v. potential, wire $\overline{D}$ being to earth. In order to restore the bistable to initial position, a negative potential is placed to the incoming wire 0D. Illustrating the other bistable circuits is done in a similar way.

The binary counters, such as TO (FIGURE 9) are pictured as two rectangles side by side containing two diagonals. The incoming wire of the counter is located in its right-hand side; the outgoing wires $\overline{TO}$ and TO are located in the lower part; and the wires 0TO and 1TO, located in the upper part are provided for placing this counter in a given position. The normal position of such a counter is 0, with wire $\overline{TO}$ to −12 v. and wire TO to earth. In order to cause this counter to shift to position 1, a −12 v. earth transition is sent over the incoming wire; wire TO is then to potential −12 v., wire $\overline{TO}$ being to earth. If a new −12 v. earth transition is sent to the incoming wire, the counter steps once and then restores to 0 position, a two-position binary counter being concerned. In order to set the counter in 0 position, whichever be its initial state, a negative potential is placed to wire 0TO; in order to place it in position 1, a negative potential is placed to wire 1TO.

By associating *n* binary counters, a counter with 2*n* positions is obtained, each counter, by restoring to initial position, sending to the following counter a −12 v. earth transition which causes said counter to step once. Thus, for example, the time distributor DT made up of two binary counters T0 and T1, enables $2^2=4$ positions.

Conventionally speaking, a counter is in 0 position when all the binary counters of which it is made up, are themselves in 0 position. Under these conditions; the 4 positions of the time distributor DT are respectively designated by 0, 1, 2, 3.

The other counters will be pictured similarly.

The black dot placed to the right of the bistable circuits and binary counters indicate that swift units are concerned, i.e.: operating for a fraction of a microsecond. This enables to use a logic circuit with elementary 3-microsecond time periods.

The vertical wires with arrows, located (on the figure) below a horizontal wire, correspond to gates "AND." Thus, for example, a −24 v. potential placed to the incoming wire *t3* of gate *po*12 cannot be transmitted to the outgoing wire 0N unless a −24 v. potential is found simultaneously to wires $\overline{S}$ and $\overline{z}$. On the other hand, if one of these latter wires is earthed, the −24 v. potential cannot be transmitted from wire *t3* to wire 0N.

On the detailed diagrams of FIGURES 7 to 11, are shown a certain number of units pictured on the general operation block diagram. For example, FIGURE 7 shows the electromechanical part OA*m* of the active unit, the electronic part OA*e* of this same unit, the branch BC common to a group of active units. FIGURE 8 shows the electromechanical part OP*m* and the passive unit's electronical part OP*e*, the branch BC′ common to a section of passive units. FIGURES 10 and 11 are concerned with the information bypath FC. The multipling arrows *a* placed between FIGURES 10 and 7 indicate that the information bypath FC is multiplied on branches BC which correspond to different groups of active units. The multipling arrows *c* placed in the middle of FIGURE 7, indicate that branch BC is multipled on all the active units of the corresponding group. And lastly, the multipling arrows *fc*2 indicate that a given unit can have access to the two information bypaths. Concerning the passive units (FIGURE 8) the multiplings are arranged in similar manner. The logical circuit CL is pictured on FIGURE 9.

The time distributor DT rotates permanently by action of the time-basis BT. It steps once every 3 microseconds. As it has 4 positions, its cycle takes 12 microseconds. Its function is regulating the different elementary operations which must be effected over each active unit. By means of "AND" gates *po*13, placed under control of the outgoing wires of the binary counters T0 and T1, a −24 v. potential is placed successively to wires *t*0, *t*1, *t*2, *t*3. The *t* equipment, placed along each of these wires, corresponds to an amplifier which enables to obtain, on outgoing, high intensity by weak impedance.

The address scanner DA of the general operation diagram is pictured on FIGURE 9 by means of two counters DA1 and DA2. The counter DA1 consists of 4 binary counters X0 . . . X3, enabling 16 combinations to be obtained. In the same way, counter DA2 consists of 4 binary counters Y0 . . . Y3, and this also gives 16 combinations. By associating the two counters DA1 and DA2, 16×16=256 combinations are obtained. Each one corresponds theoretically, to an active unit, but, in the example described, all combinations are not utilized. The 0 position is provided for achieving a certain number of logical operations; positions 1 to 158 each correspond to an active unit or to a coupler; position 159, termed "synchronization" is also utilized to logic ends.

Normally, when the transistor *tr1* is placed to the right of the address scanner DA1, DA2 is driven to cut-off by means of a +24 v. placed to its base. If there were no diode *di3*, the collector of this transistor would be to potential —24 v.; but this diode, termed clamping diode, being present, the collector of the transistor is at —12 v. The purpose of this arrangement is to determine the potential of the collector with precision when the transistor is non-conducting and hence, to prepare the accurate operation of the address scanner.

Every time the time-distributor DT restores to position 0, the outgoing wire $\overline{T1}$ goes to potential —24 v. As the bistable P is normally in position 0, wire $\overline{P}$ is also to potential —24 v. Hence, the "AND" gate located to the right of transistor *tr1* is conducting; the —24 v. potential is transmitted to the base of this transistor which saturates. The collector, which was to potential —12 v. is brought to a potential close to earth and the counter DA1 steps once. This counter steps thus every time a time distributor DT begins a new cycle.

When the counter DA1 arrives at the last position (counters *x0* . . . *x3* at 1) and receives an order from transistor *tr1*, it restores to position 0 (counters *x0* . . . *x3* at 0); at the same time, a —12 v. earth comes to the outgoing wire *x3*; hence, the counter DA2 steps once. It steps every time the counter DA1 begins a new cycle.

Counters DA1 and DA2 which make up the address scanner give binary indications. Now a decoding operation must be performed, i.e.: a current must be caused to appear on a given pair and one only, corresponding to the position of the address scanner. By means of an "AND" gate *po14* placed under the control of the outgoing wires of counter DA1, a —24 v. potential appears successively on the outgoing wires *x0* . . . *x15*. Equipment *x* placed on each of these wires, corresponds to an amplifier which enables to obtain an outgoing high intensity by weak impedance. By the same process, an earth will be placed successively to wires *y0* . . . *y15* according to the stepping of counter DA2. Under these conditions, it is easy to understand that current is caused to appear every instant over one couple of wires *xy* and one only for each position of the address scanner.

FIGURE 13 shows the address scanner RP which enables to obtain the 256 pairs *pt1*, *pt2* . . . *pt256* from wires *x0* . . . *x15*, *y0* . . . *y15*. The pair *pt1* is connected to wires *x0* and *y0*; the pair *pt2* is connected to wires *x1* and *y1*; and finally, the last pair *pt256* is connected to wires *x15* and *y15*. As previously stated, a certain number of pairs are not used.

We shall first assume that the address scanner comes to an idle unit, which is to say, to a unit which does not wish to transmit information. The seizure contact *cop* (FIGURE 7) is then open. The current sent on the pair *pt* which corresponds to this unit is received in a transformer *tfa* particular to said unit.

Normally, which is to say, when the considered active unit is not being scanned by the address scanner the transistor collector *tr2* is at about —18 v. potential obtained from the voltage divider *re1*, *re2*; said transistor is driven back to cut-off by a +24 v. potential applied to its base. The connection condenser *cd1* is charged, its left-hand terminal being at —18 v. and its right-hand terminal at —48 v. The connection condenser *cd2* is charged also, its lower terminal being earthed and its upper terminal at —48 v When the current coming from the address scanner is received, through the pair *pt*, on the primary winding of transformer *tfa*, the latter causes a negative potential to appear on the base of transistor *tr2*, driving it to saturation. Accordingly, the collector of this transistor shifts from —18 v. to a potential close to that of earth. The condenser of the connection *cd1* being charged, the positive voltage impulse is transmitted instantaneously through said condenser; hence, the right-hand terminal of the latter shifts from —48 v. to —30 v. A current then flows through the following circuits: right-hand terminal of condenser *cd1*, resistor *re5*, diode *di4*, resistor *re4*, —48 v. Owing to the value of resistors *re5* and *re4*, the potential of the junction point between resistor *re5* and the condenser *cd2* is driven to a value higher than —48 v.; a positive voltage impulse, of small amplitude is therefore transmitted through condenser *cd2* to the primary winding of the trransformer *tfi*, but the impulse does not go through on account of an appropriate threshold being caused in this transformer. This impulse cannot return to the logical circuit, which circumstance causes the transformer to conclude that the unit considered does not wish to transmit information. When the time distributor DT arrives at the end of the cycle, after 12 microseconds have elapsed, the address scanner leaves the considered unit in order to explore the next unit.

We shall now assume that the address scanner arrives at a seized active unit, which is to say, a unit which must transmit one or more bits of information to the corresponding passive unit. The seizure contact *cop* is closed, the potential of the common point between resistors *re3* and *re4* being about —42 v. From this fact, the potential of the common point between resistor *re5* and condenser *cd2* is driven to a value obviously higher than —48 v.; a positive voltage impulse, of great amplitude, is therefore transmitted through condenser *cd2* at the primary winding of transformer *tf1*.

One will note that the value of condenser *cd2* is chosen sufficiently weak so that the impulse transmitted to autotransformer *tfi* be of short duration in relation to the stopping time of the address scanner at the considered unit. This arrangement enables the transformer to get regenerated between two successive scannings, even if it must be used again for the address scanner's next position. In any case, the transformer is prevented from being used at too close intervals by numbering the active units in appropriate manner; the addresses are scanned by seizing an active unit in each group successively and not all the active units of a given group, in succession.

The impulse sent on the terminals of the secondary winding of transformer *tfi* is transmitted to the primary winding of transformer *tfi'* via the twisted pair *pt'*. Concerning the location in the exchange, the upper part BC2 of branch BC, comprised between the two dash-and-dot lines are situated beside the active unit. On the other hand, the lower part, BC3 of this same branch BC is located near the information bypath. These two locations can be rather distant from one another; it is therefore desirable for the transmission of impulses, to use twisted pairs such as *pt'* which show the best characteristics from the point of view of transmission speed.

In a normal case, which is to say, when a lack of checking is concerned, transistor *tr3* is driven to saturation by means of a —24 potential applied to its base while its collector is at a potential close to earth. When the impulse from the electronic part OA*e* of the active unit is sent to the terminals of the secondary winding of transformer *tfi'* the latter causes a slightly positive potential to the base of transistor *tr3'* driving it to cutoff. Diode *di6* and resistor *re6* act as a voltage divider whose purpose is to set the potential of wire *fl1* to a value somewhat lower than that of earth; thus is avoided the cutoff of transistor *tr3* from effects of a parasital disturbance.

Transistor *tr3* being non-conducting, its collector is at potential —24 v. Wires $\overline{D}$ and $\overline{N}$ being themselves at potential —24 v. due to the fact that the corresponding bistables D and N are in position 0, gate "AND" *po1* is driven to conduct. When the time distributor DT comes to position 3, a —24 v. potential is placed to wire *t3*. This potential is transmitted via gate *po1* to the incoming wire 1P of the bistable P which shifts to position 1. Hence, the gate "AND" located to the right of transistor *tr1* is non-conducting and the address scanner stops at the considered position. On the other hand, the gate "AND" located to the right of transistor *tr4* is made conducting every time the time distributor DT begins a new cycle, because the two wires P and T1 are both to a —24 v. potential. Transistor *tr4*, normally in a cut off state caused by the +24 v. potential applied to its base, saturates; the potential of its collector is driven from —12 v. to earth and the seizure duration counter DP receives an order to step. The purpose of this counter is to measure the time allotted to the transmission of information from the active unit to the passive unit.

In the example pictured, 37 transmission contacts *coe* are available in the electronic part OA*m* of the active unit (FIGURE 7). A first code in "two out of five" can be transmitted, followed by a second code in "two out of six," five other codes in "two out of five" and a last code in "two out of four." Practically, this number of 37 contacts must enable to cover all the possible cases of operation but it is obvious that it is in no way restrictive and can be modified upon request. The 37 transmission contacts *coe* are respectively connected to wires *u'00*, *u'01*, *m'00* . . . *m'34*, which are part of branch BC. Wires *u'00*, *u'01*, *m'00* . . . *m'34* are themselves connected respectively to wires *u00*, *u01*, *m00* . . . *m34* located in the information bypath FC.

Arrangements, not pictured, are provided for regeneration which is to say, recharge of condensers *cd3* inserted on each of the 37 wires of the informataion bypath, every time the time distributor DT begins a new cycle, in order to permit instantaneous transmission of the voltage impulse which corresponds to the bit of information. When a condenser *cd3* is thus regenerated, its right-hand terminal is at a potentail close to earth and its left-hand terminal close to a —45 v. potential.

When a transmission contact *coe* (FIGURE 7) is open, no information is sent via the information bypath. In fact, when transistor *tr2* saturates and the potential of the right-hand terminal of condenser *cd1* rises to 18 v., a current flows through the following circuit: right-hand terminal of condenser *cd1*, resistor *re7*, diode *di7*, resistor *re8*, battery. On account of the value of the different units of the circuit, the potential of the common point between diodes *di7* and *di8* is lower than —45 v.; diode *di8* is non-conducting.

On the other hand, when a transmission contact *coe* is closed, an impulse is sent over the information bypath. In fact, the common point between resistors *re8* and *re9* is close to —42 v. and, when transistor *tr2* saturates, the common point between diodes *di7* and *di8* are driven to a higher value than —45 v. Diode *di8* is therefore conducting, a positive impulse being then transmitted to the base of transistor *tr5* inserted into the information bypath. This transistor, normally saturated by the —24 v. applied to its base, becomes non-conducting; the potential of its collector is driven from earth to —24 v., on account of the presence of the clamping diode *di9*.

As stated, a translator TD is inserted in the forward circuit of the information bypath. A certain amount of wires come out of the translator, referenced *k00* . . . *k08*, *j00* . . . *j22*. Wires *k00* . . . *k08* return to the active unit; they correspond to connection *fi3* of FIGURE 3. Wires *j00* . . . *j22* are respectively connected to wires *q00* . . . *q22* which lead to the passive unit. Finally, wires *u00*, *u01* do not pass via the translator, they are directly connected to wires *v00*, *v01* leading to the passive unit.

For the convenience of the description, it will be assumed that a bit of information is transmitted via the information bypath over wire *u00*. As stated, this bit of information is substantiated by a —24 v. earth transition to the transistor collector *tr5*. Before transmitting this piece of information further, it is necessary to check whether it is correct, i.e., that it is part of a code which must consist of two elements and two only. To this effect, wires *v00*, *v01* which correspond to the considered code, are connected to the control device *ctc1*. The digit 2, which is located in the upper right-hand part of this device, shows that the code to be checked is a two element code. Wire *fi1* is connected to equipment R*ef*, which applies the appropriate potential to enable the checking device to operate. If the code received over wires *v00*, *v01* is correct, i.e., if it consists of two elements, the checking device *ctc1* causes a —24 v. potential on the outgoing wire F1.

The checking devices *ctc2* . . . *ctc9* operated in similar manner; only the number of checked code elements varies. Thus, for example, the device *ctc3* a "two out of five code"; device *ctc7* checks a "two out of six" code. Generally, these devices have two outgoing wires F which are both to a —24 v. potential if the received code is correct.

Such checking devices are well-known and currently used and can be easily constructed. In the example described, it has been preferred to use an analog method and to proceed in the following way. By means of each of the code elements, a transistor is driven to saturation and a current is sent to a resistor. The intensity of the whole current which flows through this resistor is therefore related to the number of code elements received. This enables to place in an appropriate point of the circuit, a potential which must remain close to a given value if the code received consists of two elements and two only. By means of comparers of well-known type, this potential is therefore compared to two reference potentials; if this potential is comprised between the two reference potentials, it is deduced that the code is correct; in the contrary case, the code is inaccurate. On FIGURE 9, wires *f1* and *f2* correspond precisely to these reference potentials. Naturally, such a way to proceed holds good only because the number of elements to be checked is small. A discrimination can be made between the codes made up of one, two of three elements; it could be made with certainty for codes consisting of a great number of elements.

The information received on wire *v00* (FIGURE 11) is then transmitted to wire *v'00*. The local checking devices *ctl'1* . . . *ctl'6* located in the branch BC', do the same work as the central control devices *ctc1* . . . *ctc9*.

Diode *di10*, inserted on wire V'00 is conducting as the —24 v. potential is on its lower terminal corresponding to the bit of information and a —48 v. potential is sent via resistor *re10* to its upper terminal. The piece of information will therefore be transmitted to the electronical part OP*e* of the passive unit as a —24 v. potential.

If information had not been transmitted over the considered wire *v00*, transistor *tr5* of the information bypath would have remained saturated, the earth placed on its collector would have been transferred over wire *v00*, diode *di10*, wire V'00 to the passive unit.

To sum up, a —24 v. potential on wire V' of the branch BC' corresponds to the reception of a piece of information, an earth on this same wire corresponds to an absence of information.

As previously stated, the transformer *tfa* of the considered active unit (FIGURE 7) receives a current on its primary winding during the whole length of the pause of the address scanner at this unit. The current gathered at the terminals of one of the secondary windings of this transformer flows through the following circuit: earth, secondary winding of *tfa*, diode *di11*, resistor *re11*, wire *c* automatic exchange's selection chain and, in the passive unit (FIGURE 8), wire *c*, diode *di12*, primary winding of transformer *tfp*, earth. Transistor *tr6*, located to the right of transformer *tfp* is normally cut-off by a a +24 v. potential applied to its base. When the current comes onto wire *c*, the transformer causes a negative potential to appear onto the base of this transistor, to saturate it. Its collector, previously to the —18 v. potential obtained by means of the voltage divider *re*12, *re*13, is then driven to a potential close to earth. This earth is applied through diode *di*23 to the primary winding of the upper terminal of the reception transformer *tfr'*.

The rather special assembly of transistor *tr*6 must be noted. As the current received in the transformer *tfp* is limited by resistor *re*11 in the active unit, the negative potential meant to saturate resistor *tr*6 is transmitted directly via diode *di*21. Thus, better efficiency is secured. Resistance *re*17, placed in parallel with diode *di*21, is utilized when the current disappears in transformer *tfp*. At this moment, the latter on account of the overvoltage resulting from the break, delivers a highly positive potential which rapidly drives the transistor to cutoff via resistor *re*117. Diode *di*22 enables to dispose of this positive overvoltage.

When the seizure duration counter DP (FIGURE 9) is in position 0, its outgoing wires $\overline{D0}$ . . . $\overline{D3}$ are all to a —24 v. potential on account of this, the gate "AND" placed to the left of transistor *tr*7 is made conductive. A —24 v. potential is then transmitted via this gate to the base of transistor *tr*7 and the latter, normally cut off, saturates. Hence, the potential of wire *th* connected to its collector, shifts from a —12 v. to an earth potential. Gate *po*2 is cut off by this earth and the —24 v. potential cannot be transmitted onto outgoing wire *bm*.

As soon as the seizure duration counter shifts to position 1, the gate "AND" placed to the left of transistor *tr*7 is cut off; the transistor is also nonconducting and the potential of wire *th* shifts from earth to —24 v. If all the codes transmitted through the information bypath are correct, wires F1, F2, F'2, F3, F'3, F4, F'4, F5, F'5, F6, F'6 are also to a —24 v. potential; hence, gate *po*2 is rendered conducting and a —24 v. potential is transmitted over outgoing wire *bm*. From there it reaches via wire *bm* of branch BC' the gate *po*3 which prepares said gate to become conducting. If the codes transmitted via branch BC' are all accurate, wires F1*a* . . . F'6*a* are themselves at a —24 v. potential; gate *po*3 is rendered conducting and the 24 v. potential reaches the amplifier AM'. The latter gives a —24 v. potential on the wire which ends at the primary winding of the reception transformers *tfr'*. As the other terminal of this primary winding is earthed by the collector of transistor *tr*6, a current flows. On the base of the normally cut-off transistor *tr*8, said transformer *tfr'* causes a potential to appear which saturates it. The emitter, previously at a potential close to earth obtained by means of the voltage divider *re*14, *di*13, then shifts to a potential close to that of the collector, i.e.: —48 v. This potential is transmitted via fuse *f* and diode *di*14 to condenser *cd*4 which charges. This is possible only because information is in process over the information bypath, which places, as previously stated, a —24 v. potential on reception wire V'. In case of lack of information, this wire is earthed and the condenser short-circuited by this earth cannot get charged.

As indicated by the arrow, the fuse *f* is multiplied on the different reception wires *v'* and *q'* of the considered unit. In the pictured example, it was assumed that there exists only one wire *v'* and 23 wires *q'*. The function of this fuse is to prevent the defect of an individual unit to spread over to the information bypath.

In each passive unit is found for each code element to be received a transistor *tr*9 and a reception relay *r'*. Normally, transistor *tr*9 is rendered non-conducting by means of the +24 v. potential applied to its base. When the charge of condenser *cd*4 is sufficient, this transistor saturates, this collector passes to a potential close to earth and relay *r'* is set under voltage. Naturally, the duration allotted to transmission of information from the active unit to the passive unit, i.e.: 108 microseconds, is entirely insufficient to cause the energization of the relay; between two travels of the address scanner, the condenser discharges slowly, but insufficiently for the transistor to be cut-off and relay *r'* remains current fed. It will be able to energize after a certain number of cycles.

The purpose of the voltage divider, constituted by resistance *re*14 and diode *di*13 is to set, in rest position, the potential of the emitter of transistor *tr*8 to a higher value than that of earth; thus the reception condenser *cd*4 is prevented from getting charged in an untimely way under parasital interferences.

It must be noted that the wires for receiving information are 25, divided into 2 *v'* wires and 23 *q'* wires, whereas there are only 24 *r'* relays. Actually, the two code elements received on wire *v'* correspond to the same bit of information. If this bit is present, the two *v'* wires are to potential —24 v. and relay *r'* allotted to this bit of information is energized, if the bit of information is not there, the two *v'* wires are to earth and relay *r'* remains at rest. Therefore, it seems only one wire *v'* is sufficient; but, to obtain a code which can be controlled according to the "two-out-of-*n*" system, it is essential to provide two code elements and consequently, two *v'* wires. It is obvious that these two *v'* wires end at the control device *ctl'*1, but only one of them reaches the reception-transistor *tr*9.

From the preceding explanations, it appears that reception of the bit of information on relay *r'* is prevented as long as the seizure duration counter DP is in 0 position This is necessary for the following reason. When the electromechanical part of an active unit releases, its relays deenergize and contacts *cop* and *coe* open. The seizure contacts *cop* can well open before one of the emission contacts *coe*; in the absence of special precautions, it could happen that a unit in rest position were checked and that when the checking is over one or more untimely bits of information be transmitted towards the information bypath. By allowing only transmission of information when the seizure duration counter has left position 0, i.e. 12 microseconds after the check, this inconvenience cannot happen.

When the seizure duration counter DP (FIGURE 9) shifts to position 9, i.e. 108 microseconds after the checking is over, the duration allotted to the transmission of information from the active unit to the passive unit has expired. The respective positions of the binary counters D3, D2, D1, D0 which constitute the seizure duration counter DP are the following: 1, 0, 0, 1. Hence, gate *po*4, located in the lower left part of the logical circuit, is rendered conducting, a —24 v. potential being then transmitted over wire *d* which renders gate *po*5 conducting, and the bistable D shifts to position 1.

The time-period distributor DT being in 0 position, the —24 v. potential placed on wire *t*0 is transmitted to the base of the normally non-conducting transistor *tr*12, via a gate made conducting by wire *d*. This transistor saturates the potential of its collector which was set at —12 v. by the clamping-diode *di*16, shifts to 0V. The seizure totalizer TP steps once. The purpose of this totalizer is to count the number of units which have transmitted information during a cycle of the address scanner.

When the time distributor DT comes to position 1, the —24 v. potential placed to wire *t*1 is transmitted, via gate *po*5 rendered conducting by means of wire *d*, to wire 1D. The end-of-seizure bistable D shifts to position 1.

When the time distributor DT comes to position 2 the —24 v. potential on wire *t*2 is transmitted, via a gate AND rendered conducting by wire $\overline{D}$, at the base of transistor *tr*10 normally cut-off. This transistor saturates; the potential of its emitter becomes close to that of the collector, i.e. shifts to —12 v. This potential is transmitted over wires OD0 . . . OD3, so as to put back into 0 position, the different binary counters which constitute the seizure duration counter DP.

When the time distributor DT comes to position 3, the —24 v. potential placed to wire *t*3 is transmitted over wire OP via gate *po*6 rendered conducting by wires $\overline{D}$ and $\overline{S}$. The return of the seizure bistable P to position 0 is thus caused.

When the time distributor DT comes to position 0, the —24 v. potential on wire *t*0 is transmitted to wire 0D, so as to restore the end-of-seizure bistable D to 0 position.

The different units of the logical circuit are all back to their initial position, except the seizure totalizer TP which has progressed one step and of the time distributor and the address scanner, which continue travelling permanently.

The following active units are scanned according to the same process.

When the address scanner leaves the considered unit, the current is cut from the twisted pair *pt* and the different transistors of FIGURES 7, 8, 10, 11 return to their initial states. It must however be noted that it is necessary to regenerate the different connection condensers, i.e.: to re-charge them; this is unavoidable in order to obtain practically instantaneous transmission during the following scanning.

When the 108 microsecond delay allotted to the transmission of information from the active unit to the passive unit is over, the connection condenser *cd*1 (FIGURE 7) has slightly discharged; its right-hand terminal which was at —30 v., is at a potential close to —31 v. When the current is cut from pair *pt*, transistor *tr*2 is cut off, as the left-hand terminal of condenser *cd*1 shifts from 0 to —18 v., which value is determined by the voltage divider *re*1, *re*2. The right-hand terminal of this condenser then shifts from —31 v. to 49 v.; diode *di*15 becomes conducting, which enables the condenser to re-charge rapidly. The connection condenser *cd*2 re-charges through the following circuit: earth, resistor *re*15, condenser *cd*2, diode *di*4, resistance *re*4, battery. The condensers *cd*3 inserted on the information bypath are systematically regenerated every time the time distributor begins a new cycle by means of non-pictured circuits.

Diodes *di*23 and *di*24 (FIGURE 8) are provided for swift flow of negative overvoltage which appears on the upper terminal of the primary winding of transformer *tfr'*.

It was assumed in the above description that the information was transmitted from the active unit to the passive unit. The process of operation is the same when the transmission must be done in the reverse direction. When the passive unit calls the active unit is notified by means of the selection chain of the automatic switching equipment; the seizure contact *cop* (FIGURE 7) closes and the checking is done in normal manner. In the electromechanical part OP*m* of the passive unit, are found a certain number of emission contacts *coe'* which each correspond to a code element. In the pictured example it was assumed that there were 11 *coe'* contacts respectively connected to wires *l'*00 . . . *l'*10 of branch BC'. These wires are respectively connected to wires *l*00 . . . *l*10 of the information bypath. When coming out of this bypath the information is taken onto wires *p*00 . . . *p*10 and finally received on the reception relays *r*1 . . . *r*10. As indicated in the case of the passive unit, only 10 reception relays are found instead of 11 because the code elements received on wires *p'*09, *p'*10 correspond to a single bit of information.

Certain bits of information emitted by the active unit, after translation by TD are not transmitted to the passive unit, but return to the active unit through wires *k*00 . . . *k*03.

It was assumed that the maximum number of active units liable to call at peak hour was 32. Generally, the address scanner arrives at the end of its cycle without having found out the 32 calling units. As these units number 158, the address scanner is then on position 159. This position is said "synchronizing" because it is utilized for regulating the duration of the cycle, which must always be the same. Gate *po*7 of the logical circuit CL is conductive as it is connected to the different outgoing wires of the address scanner which characterize in combinations position 159. In fact, if we add the weight which corresponds to these different wires, i.e.: 1, 2, 4, 8, 16, 0, 0, 128, number 159 is found. Hence, the —24 v. potential, placed at the inlet of this gate is transmitted to wire S. When the time-distributor DT is found in 0 position, the —24 v. potential placed to wire *t*0 is transmitted to wire 1S via gate *po*8 rendered conductive through wire *s*. Hence, the synchronizing bistable S shifts to position 1.

When the time-distributor DT comes to position 1, the —24 v. potential placed to wire *t*1 is transmitted to the base of the normally cut-off transistor *tr*11, via an AND gate which is rendered conductive by means of wire $\overline{S}$. This transistor gets saturated; its emitter, connected to wires OX0 . . . OX3, OY0 . . . OY3, shifts to a —12 v. which causes the different binary counters of the address scanner to be shifted back to 0.

When the time-period distributor DT comes into position 3, the —24 v. potential placed to wire *t*3 is transmitted to wire 1P via the AND gate *po*9 rendered conductive through wires $\overline{D}$ and $\overline{S}$. The seizure bistable shifts to position 1, although no current has been emitted on a twisted pair. From then on, everything occurs in the logical circuit as if a seized unit had been checked; the address scanner is non-conducting and the seizure-duration counter DP is started so as to measure the 108 microsecond time-period normally allotted to the transmission of information of an active unit to a passive unit. An artificial seizure is indeed in process.

When this 108 microsecond time period is over, the seizure totalizer TP steps once. The end of seizure bistable D shifts to position 1; the seizure duration counter DP restores to normal; the end of seizure bistable D restores to 0 position; only the seizure bistable P remains in position 1, as the gate *po*6 is non-conducting on account of the position of the synchronization bistable S (wire $\overline{S}$ to earth).

A new 108 microsecond delay is then counted according to the same process while the totalizer TP progresses another step.

When totalizer TP, having left position 0 arrives in position 32, there are 32 unit seizures which can be real or artificial but the duration of the address scanner cycle is defined with precision. We have actually counted for each of the 158 units, 12 seconds for the test, plus 108 microseconds for the real or fictitious transmission of information over 32 units. The total duration of the cycle is therefore 5,352 microseconds ($158 \times 12 + 108 \times 32$). This duration is very acceptable for the correct operation of the reception devices.

The totalizer TP being in position 32, the gate *po*10 is rendered conducting. When the time distributor DT comes to position 1, the —24 v. potential placed to wire *t*1 is transmitted to the outgoing wire 1N which causes the end-of-operation bistable of totalizer N to shift into position 1.

When the time distributor DT comes to position 2, the —24 v. potential placed to wire *t*2 is transmitted via an AND gate rendered conducting through wire $\overline{N}$, at the base of the normally cut off transistor *tr*13. This transistor saturates; its emitter, connected to wires 0E0 . . . 0E5, shifts to —12 v., which causes the return to normal of the different binary counters which constitute the seizure totalizer TP. On this same position 2 of the time distributor, the —24 v. potential placed to wire *t*2 is transmitted, via an AND gate rendered conducting through wire N, to wire 0S. Hence, the synchronisation bistable S restores to rest.

The address scanner being at rest, gate *po*11 is conducting and wire *z* is at —24 v. When the time distributor DT comes to position 3, the —24 v. potential of wire *t*3 is transmitted, via gate *po*12 to wire 0N, as wire $\overline{S}$ has just shifted to —24 v. The end-of-operation bistable of totalizer N restores to rest position. On this same position 3 of the time distributor, the potential of wire $t3$ is transmitted via gate $po6$, to wire 0P. The seizure bistable restores to 0 position.

Finally, when the time distributor DT comes to position 0, the —24 v. potential of wire $t0$ causes the end of seizure bistable D to restore to 0 via wire 0D.

The different units of the logical circuit have restored to their initial position, the counters and bistables being all in 0 position, and the address scanner begins a new cycle.

In certain exceptional cases, the number of active units that call simultaneously is higher than 32. If the length of the cycle of the address scanner is desired constant, no new seizures must be made. The scanning will be limited to the remaining units which will be checked; but, whatever be the result of this check, the address scanner steps to the next unit when the 12 microseconds are over. Actually, when the seizure totalizer TP comes to position 32 before the address scanner has explored all the active units, the gate $po10$ becomes conducting; wire 1N is set to the —24 v. potential and bistable N steps to position 1. If a seized unit is checked, a —24 v. potential is received on wire $pr$ connected to gate $po1$, but the latter remains cut-off on account of the position of bistable N wire $\overline{N}$ to earth). The —24 v. potential of wire $t3$ is not transmitted to wire 1P, the seizure bistable P remains in position 0 and the address scanner steps immediately to the following unit.

When the address scanner steps to position 159 after scanning the last unit, bistable S steps to position 1, the address scanner is restored to position 0 and the logical circuit is back in the position it occupied in the preceding case. The same duration is obtained for the cycle of the address scanner.

Finally, in the limit case where the number of simultaneous calls is equal to 32, the totalizer TP comes to position 32 after the last seizure. Then, the address scanner steps to the synchronization position, or position 159 and the preceding case has turned up again.

The operation of the second information bypath is identical to that of the first. The only difference is that a current of reverse direction to the one used in the first bypath, is transmitted over wire $c$ (FIGURE 7) from the emission transformer $tfa$ 1. In the passive unit, this current is sent via diode $di17$ onto transformer $tfp1$ provided for the second information bypath.

When the address scanners of the two information bypaths are in phase, i.e., when they scan the same unit, the two transformers $tfa$ and $tfa1$ emit in parallel on wire $c$. To prevent the two currents, which flow in reverse directions from cancelling each other, a weaker value than that flowing through resistor $re16$ has been chosen. The current omitted by transformed $tfa$ of the first information bypath is predominating; in the passive unit, only transformer $tfp$ receives current. Under these conditions, exchange of information can take place only through the first bypath, the second bypath remaining un-used.

Naturally, the receiving device is dimensioned in such a way that transistor $tr9$ remains saturated between two cycles of the address scanner, even if one of the information bypaths remains un-used.

A Zener diode $di18$ has been mounted in parallel with the primary winding of transformer $tfp$. Its function is the suppression of the peaks of voltage coming from transformer $tfa$ of the first information bypath; standardized transformers $tfp$ and $tfp1$ can thus be utilized for the two information bypaths. For the sake of economy, this diode is common to all the units of a same group and is placed in the branch BC′.

The two transformers $tfa$, $tfa1$ (FIGURE 7) both connected to wire $c$, could issue current to one another; to avoid this drawback, two diodes, $di19$ and $di20$ are provided.

Certain switching operations are designed to be done in translator TD so as to apply to the calls a night feecharge different from the day charge. The purpose of wire $zt$ (FIGURE 10) connected to one of the outgoing wires of bistable N is to allow these switchings only when the bistable is in position 1, i.e., when it is certain that there is no transmission of information via the information bypath.

It is clear that the preceding description has only been given as an unrestrictive example and that numerous alternatives can be realized without departing from the scope of the invention. The diagram of FIGURE 1 is only designed to show the purpose of the invention which, covering a large general scope, can be applied to all telephone systems that necessitate a swift exchange of considerable information between the common units. In particular, the different numerical bits of data have been mentioned only as an example to facilitate the understanding of the functioning but they are liable to vary with each particular case.

*Summary*

The invention concerns improvements to telephone systems in which information is exchanged between the control units and the common units via the information bypath, according to the time division multiplex system. These units are divided into "active units" and "passive units" and successive scanning of active units is effected in order to check them; when a calling active unit is detected i.e.: desiring to proceed to an exchange of information, a gate associated with this unit is rendered conducting so as to give it access to the information bypath and, through the selection chain of the automatic switching equipment, a signal is transmitted to the associated passive unit, so as to also render conducting the gate which gives access to the information bypath these arrangements enabling to realize an economy of positions of the address scanner in charge of the scanning.

Means are provided to obtain, for the cycle of the address scanner a constant duration as short as possible.

I claim:

1. In an automatic telephone switching system for extending connections between calling and called lines and trunks served by said system, a plurality of switching stages, control equipment common to said lines, trunks and switching stages for receiving control data from said lines and trunks and for controlling said switching stages in accordance therewith, and connecting circuits having a plurality of time-division channels thereon extending between said common control equipment and said switching stages for transmitting the said control data to said stages on a time-division multiplex basis, scanner means for periodically and cyclically scanning the said common equipment for sampling the data received thereby for transmission over said channels at time intervals corresponding to said channels, means for advancing said scanning means step by step, and means for temporarily delaying each said advancement responsive to the said control equipment containing control data to be transmitted during the corresponding time interval.

2. In an automatic telephone switching system as set forth in claim 1, timing means for causing said scanning means to start repeated cycles after predetermined time intervals, totalizing means for totalizing the time said scanning means completes one scanning cycle, and means responsive to said scanning means completing said scanning operation in less than said predetermined time interval for delaying the next successive cyclic scanning operation a corresponding time period.

3. In an automatic telephone switching system as set forth in claim 2, means responsive to said predetermined time interval expiring prior to the said scanning means completing one cycle of scanning operations for controlling said scanning means to start the next successive scanning cycle.

4. In an automatic telephone switching system for extending connections between calling and called lines and trunks served by said system, a plurality of switching stages, control equipment common to said lines, trunks and switching stages for receiving control data from said lines and trunks and for controlling said switching stages in accordance therewith, connection circuits having a plurality of time-division channels thereon extending between said common control equipment and said switching stages for transmitting the said control data to said stages on a time-division multiplex basis, second multiplexed connecting circuits having a plurality of time-division channels thereon extending between said common control equipment and said switching stages, means for connecting said first and second multiplexed connecting circuits in parallel for the simultaneous transmission of control data to said switching stages, comparing means operable responsive to the time positions of said first and second connecting circuits being identical for comparing the said control data being transmitted by each, and means responsive to different data being transmitted during said identical time positions for generating a supervisory signal.

5. In an automatic telephone switching system for extending connections between calling and called lines and trunks served by said system, a plurality of switching stages, control equipment common to said lines, trunks and switching stages for receiving control data from said lines and trunks and for controlling said switching stages in accordance therewith, connection circuits having a plurality of time-division channels thereon extending between said common control equipment and said switching stages for transmitting the said control data to said stages on a time-division multiplex basis, and means responsive to the time position of said first and said second multiplexed connecting circuit being identical for disabling the effective transmission of said control data over one of said connecting circuits to prevent the duplication of simultaneous control data transmission.

References Cited by the Examiner

UNITED STATES PATENTS

| | | | |
|---|---|---|---|
| 3,036,161 | 5/1962 | Cirone et al. | 179—18 |
| 3,047,668 | 7/1962 | Gotthardt et al. | 179—18 |

ROBERT H. ROSE, *Primary Examiner.*

WILLIAM C. COOPER, *Examiner.*